July 11, 1961

C. ALIMANESTIANO 2,991,732

COMBINATION ROAD AND RAILWAY VEHICLES

Filed Nov. 30, 1959

INVENTOR.
CONSTANTIN ALIMANESTIANO
BY
Prangley, Baird Clayton
Miller & Vogel,
ATTORNEYS

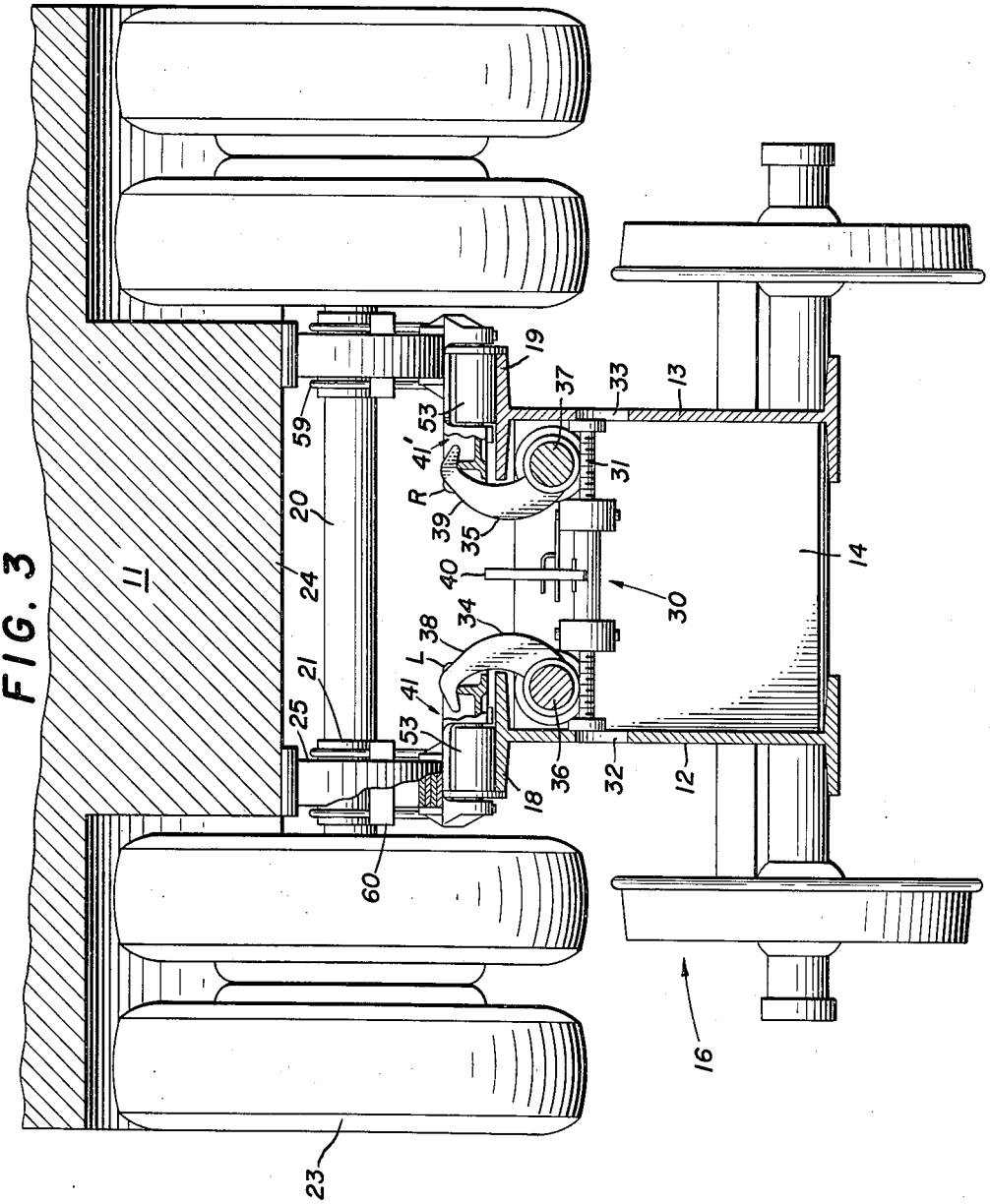

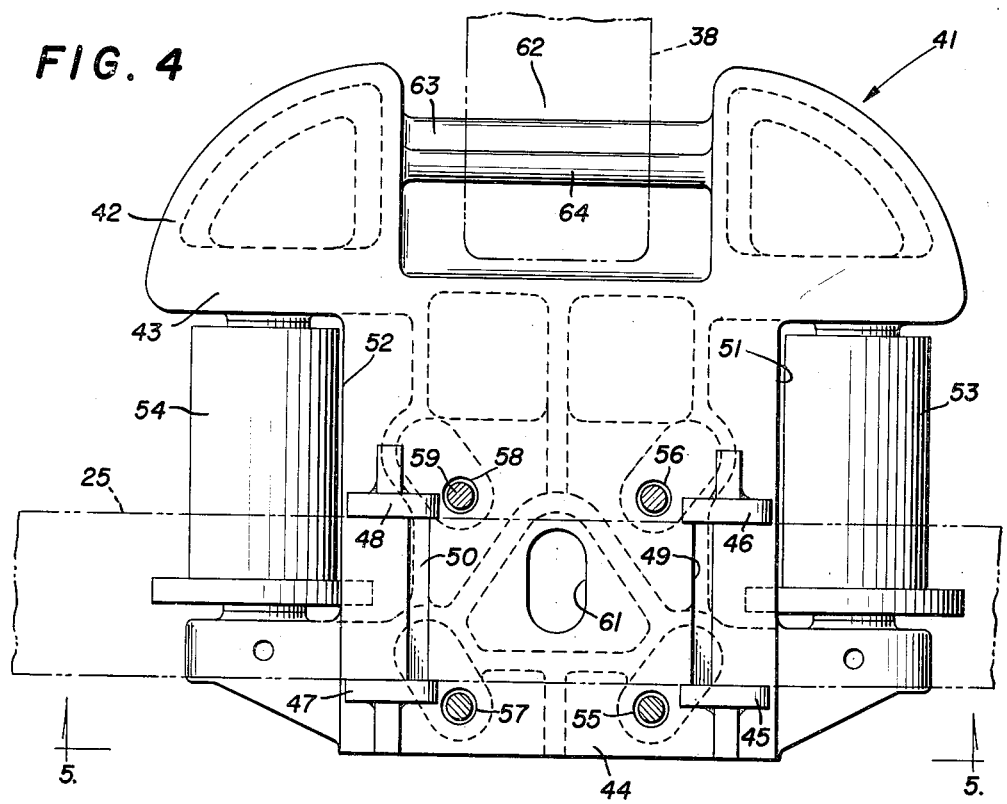
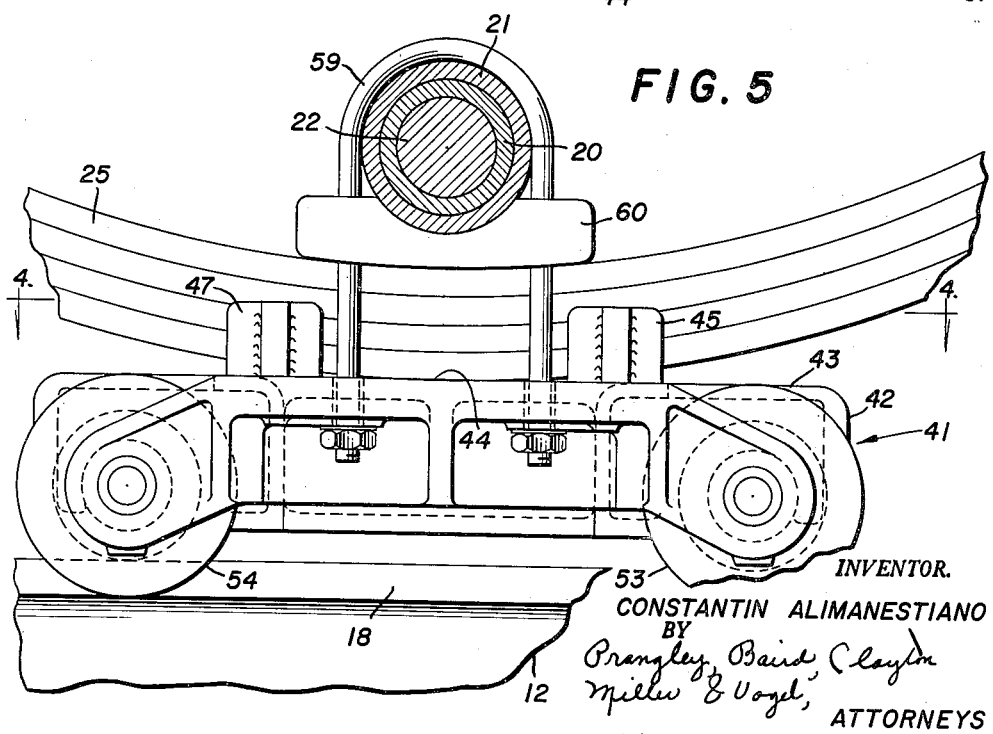

United States Patent Office 2,991,732
Patented July 11, 1961

2,991,732
COMBINATION ROAD AND RAILWAY VEHICLES
Constantin Alimanestiano, Chicago, Ill., assignor to General American Transportation Corporation, Chicago, Ill., a corporation of New York
Filed Nov. 30, 1959, Ser. No. 856,163
4 Claims. (Cl. 105—368)

This invention relates to combination road and railway vehicles useful in a system of freight transportation; and it relates more particularly to a road vehicle having underslung springs, such as a moving van, and to a truck assembly therefor to support the vehicle upon a track provided along the top of a railway car.

Such a rail-and-road transportation system includes a skeleton railway car characterized by the absence of a body and having only a narrow frame lying wholly between the planes of the inner sides of the wheels of its running gear. An outwardly facing narrow gauge track is defined along the top of the frame for supporting rolling freight carriers; and a road vehicle is an exemplification of a rolling freight carrier which may be included in the transportation system. Such a road vehicle in addition to its road wheels is equipped with inwardly facing flanged rollers mounted between the planes of the inner surfaces of its road wheels, and these rollers engage the rails of the narrow gauge track to support the vehicle upon the railway car during rail transportation of the vehicle.

The usual road vehicle incluuded in such transportation system is commonly known as a semi-trailer, and a moving van is generally similar to such trailer but differs therefrom principally in that the axle of the van is resiliently coupled to the chassis by underslung springs which permit the chassis to be located closer to the road surface and thereby enable the freight-carrying compartment or body of the van to have a greater vertical dimension, and consequently a greater volumetric capacity, than the usual semi-trailer. A freight-carrying compartment of substantial volume is desirable in a moving van because the lading transported thereby is quite bulky but does not have a large weight-to-size ratio.

In order to use such a moving van in a road-and-rail transportation system of the character described, it is necessary to equip the van with flanged rollers adapted to engage the auxiliary narrow gauge track provided along the top of a railway car so as to support such trailer thereon indpendently of its road wheels; and the provision of such a roller-equipped van is one of the objects of this invention.

Another object of the invention is the provision of a roller-equipped truck in operative combination with a road vehicle having an underslung spring suspension for supporting such road vehicle upon the longitudinally extending auxiliary track of a railway car independently of the road wheels of the vehicle.

Still another object of the invention is that of providing a truck for use with a road vehicle having an underslung spring suspension, in which the truck is equipped with saddle structure for receiving and supporting a leaf spring incorporated in such spring suspension, and in which the truck is also provided with flanged rollers for engaging a rail of such auxiliary track provided by a railway car to support the road vehicle thereon.

Other features and advantages of the present invention will be brought out in connection with a detailed description of a truck assembly embodying the invention, and shown in the accompanying drawings, in which:

FIGURE 3 is an enlarged, broken vertical sectional view taken along the line 3—3 of FIGURE 1, and illustrating a tie-down assembly for securing the van to the railway car to limit relative longitudinal movements therebetween;

FIGURE 4 is an enlarged, top plan view of one of the trucks illustrated in FIGURE 2; and FIGURE 5 is an enlarged, broken side view in elevation of a portion of a truck shown in operative combination with the axle housing and one of the springs of the road vehicle.

Figure 1:
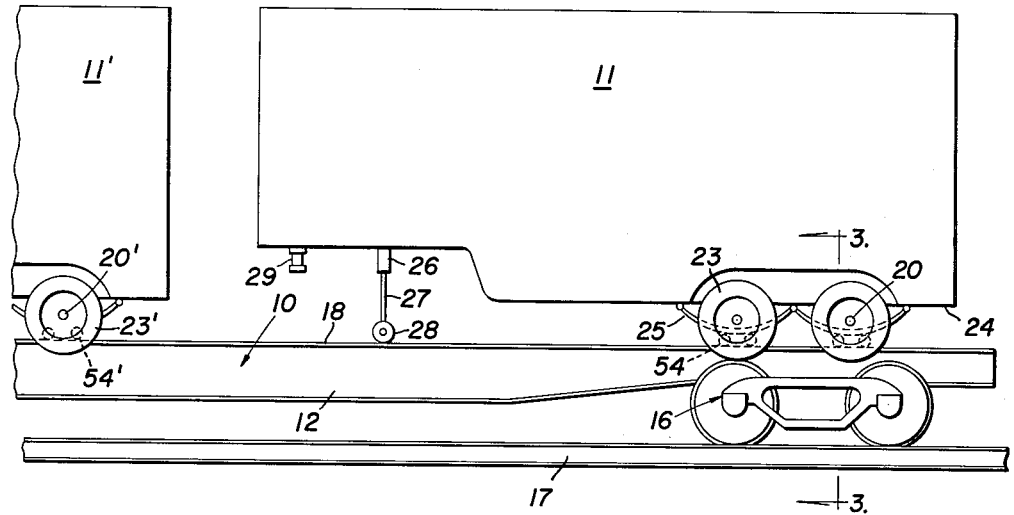
FIGURE 1 is a broken side view in elevation of a road-and-rail transportation system illustrating a part of a railway car having van-type road vehicles mounted thereon for rail transportation.

Referring to FIGURE 1 of the drawings, the system of freight transportation there illustrated essentially comprises a railway skeleton car 10 and two freight cars 11 and 11', each embodying the features of the present invention; also, each of the freight carriers comprises a freight-carrying body or container, each in the form of a road vehicle and specifically in the form of a moving van. In the arrangement, the railway car 10 carries two moving vans on the respective end portions thereof which are identical, whereby only one end of the railway car is shown. The road vehicles 11 and 11' are identical, and therefore only a portion of the vehicle 11' is illustrated.

Preferably, the railway car 10 is of the construction and arrangement of that disclosed in the copending application of Deodat Clejan, Serial No. 789,596, filed January 28, 1959. This railway car 10 comprises a long narrow box-shaped frame consisting of two substantially parallel I-beams 12 and 13 secured together by cross braces 14 which also may be in the form of I-beams, as shown best in FIGURE 3. The ends of the frame of the railway car are supported on bolsters of four-wheeled trucks 16 of usual construction rollingly supported on the rails of a track 17 of standard rail gauge. The frame of the car 10 lies wholly inside of the planes defined by the inner surfaces of the wheels of the trucks 16, and the upper outer flanges 18 and 19 of the respective I-beams 12 and 13 provide the rails of a narrow gauge track for supporting inwardly facing flanged rollers carried by the road vehicles. The van-type road vehicles illustrated each have an axle assembly 20 of usual construction; and while moving vans ordinarily have a single axle because the furniture or similar lading transported thereby is not heavy, it will be understood that the invention is equally applicable to tandem axle vans.

As shown most clearly in FIGURE 5, the axle assembly 20 includes an axle housing 21 equipped with an axle 22 carrying road wheels 23 adjacent to each end thereof. The axle housing 21 is resiliently secured to the chassis 24 of the vehicle by underslung spring suspensions, each comprising an elongated leaf spring assembly 25.

The front end of the van 11 has the usual front landing gear 26 including two telescoped legs 27 carrying at their lower ends small dolly wheels or flanged rollers 28. The telescoped legs 26 are operated by manually controlled hydraulic or mechanical mechanism (not shown) for raising and lowering the rollers 28 so that they may support the front end of the van when it is detached from a tractor and may be drawn up out of the way when the tractor is attached to a van for road operation. The front end of the van 11 is equipped with a king pin 29 to permit securance of the van to the fifth wheel of a tractor during road operation. The van 11' is of identical construction, and therefore the primed equivalents of the same numerals used in connection with the identification of the various components of the van 11 are applied to the corresponding components of the van 11'.

The rear end portion of each of the vans is supported by the road wheels 23 during road usage, but during railway car transportation the rear end portion of each van is supported independently of the road wheels by truck assemblies that engage the track defined along the top of the railway car 10 and which are secured to the axle assembly of the van. A pair of trucks are provided for the axle assembly, and such trucks are disposed adjacent and inwardly of the road wheels 23 respectively associated therewith. As well as supporting the rear end portion of the van, the trucks are employed in tying-down or anchoring the van to the railway car for such anchorage is necessary to limit relative longitudinal movements therebetween, and is preferably accomplished by utilizing the axle of the van for applying thereto the longitudinal impact forces intermittently developed because of accelerations and decelerations of the railway car.

An exemplary anchor structure for connecting the van to the railway car is illustrated in FIGURE 3, and is designated generally with the numeral 30. The structure 30 includes an actuating shaft 31 equipped at the opposite end portions thereof with reversely oriented threads, and the shaft extends between the beams 12 and 13 of the railway car and is adapted to be rotated from either end thereof by a suitable crank (not shown) through vertically elongated slots 32 and 33 respectively formed in the beams 12 and 13. Actuated by the shaft 31 are gimbal devices 34 and 35 respectively comprising nuts engaging the threaded end portions of the shaft 31, crank arms connected with the nuts and which in turn are carried by longitudinally extending shafts 36 and 37, and hooks 38 and 39 selectively movable upon rotation of the shaft 31 between an extended clamping position which is shown in FIGURE 3, and a retracted position in which the hooks lie substantially below the flange rails 18 and 19. Components 40 are associated with the shaft 31 and constitute a signal and locking arrangement to constrain the shaft 31 against rotation so as to maintain the hooks 38 and 39 in the extended clamping positions thereof and to provide a visual indication of such positions of the hooks. The shafts 36 and 37 are longitudinally movable along the beams 12 and 13, and are respectively connected to cushioning structure (not shown) which yieldingly resists relative movement between the van and the car.

The hooks 38 and 39 respectively cooperate in the extended clamping position thereof with a pair of trucks 41 and 41'. The trucks 41 and 41' are identical and are simply arranged right and left adjacent opposite end portions of the axle assembly 20 intermediate the road wheels 23. It will be understood then that the following description applies equally to both the trucks 41 and 41', and the two separate numerals have been employed simply for convenience to differentiate the left-hand and right-hand trucks.

Figure 2:
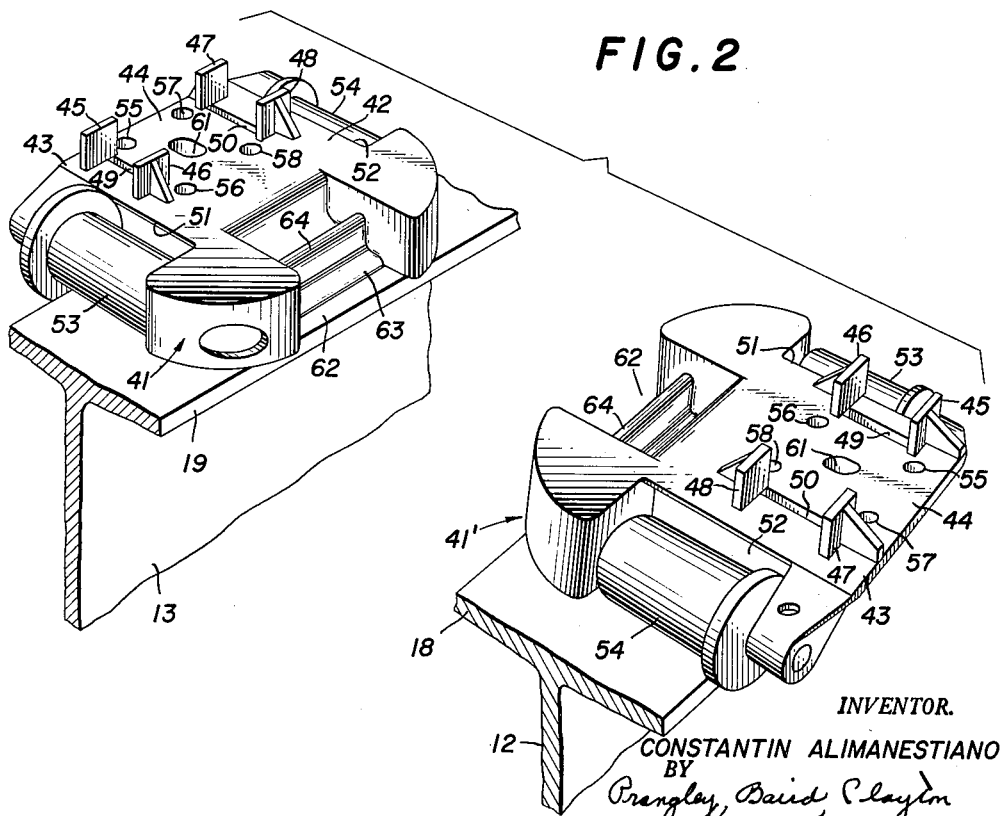
FIGURE 2 is a perspective view of the left and right trucks used in connection with a road vehicle having an underslung spring suspension.

Considering then the truck 41, as shown in FIGURES 2, 4 and 5, it comprises a frame or housing 42 having a generally planar top wall 43 defining a saddle 44 adapted to engage and seat one of the springs 25 thereon. Extending upwardly from the top wall 43 and forming a part of the saddle are a plurality of abutment elements arranged in longitudinally spaced pairs with the abutment elements in each pair being laterally spaced apart. The first pair of laterally spaced abutment elements is denoted with the numerals 45 and 46, and the second pair with the numerals 47 and 48. The elements 45 and 47 are oriented in longitudinal alignment, as are the elements 46 and 48. The abutment elements are adapted to straddle a spring assembly 25, as illustrated in FIGURE 5, and extend upwardly along the longitudinal edges of such spring assembly so as to prevent lateral displacement thereof with respect to the truck. The top wall 43 is provided with longitudinally spaced slots 49 and 50 respectively extending between the paired abutment elements 45, 46 and 47, 48.

The frame 42 is respectively provided along the longitudinal edges thereof with recesses 51 and 52 respectively receiving therein a pair of flanged rollers 53 and 54 rotatably supported by the frame and adapted to rollingly engage the associated rail of the auxiliary, longitudinally extending track defining along the top of the railway car 10. The rollers 53 and 54 then are necessarily disposed in longitudinal alignment, and are respectively located in the rear of and in the front of the axle 22 of the vehicle, as is clear from FIGURE 2. Further, the flanges of the rollers are inwardly facing and, therefrom, ride along the outer longitudinal edge portions of the flange rails 18 and 19.

The frame 42 is provided with a plurality of openings respectively adjacent the abutment elements, and such openings are designated with the numerals 55, 56, 57 and 58. The openings 55 and 57 are longitudinally aligned and are spaced from each other; and similarly, the openings 56 and 58 are longitudinally aligned and are spaced from each other. The openings 55, 57 and 56, 58 are respectively disposed laterally outwardly of the corresponding abutment elements 45, 47 and 46, 48. The openings are adapted to cooperate with fastener elements 59 to secure the associated truck to one of the spring assemblies 25 and to secure that spring assembly to the axle housing 21 in underslung relation therewith. In the specific embodiment illustrated, the fastener 59 is an inverted, generally U-shaped bolt circumjacent the upper surface of the axle housing 21, and the end portions of the bolt extend downwardly along the spring assembly 25 and through one pair of the longitudinally aligned openings, such as the openings 55, 57 as shown in FIGURE 5. The ends of the bolt are threaded for receiving nuts thereon to draw the various components into tight frictional engagement.

It will be apparent that a pair of U-bolt fasteners 59 will be used in conjunction with each of the trucks, and will respectively cooperate with the openings 55, 57 and 56, 58. A mounting element or saddle member 60 is disposed between the axle housing 21 and the upper surface of the spring assembly 25, and defines a seat or pocket for the undersurface of the axle housing and thereby firmly seat the axle housing relative to the spring assembly. The spaced legs of each of the fastener elements 59 extend through the mounting member 60 so as to positively locate the same; and because the openings 55, 57 and 56, 58 are spaced laterally outwardly from the associated abutment elements, and because the openings through the mounting member 60 are respectively aligned with these openings, the legs of the fastener elements 59 are spaced slightly from the longitudinal edges of the spring assembly 25 whereby the abutment elements constrain the individual leaf springs of the spring assembly 25 against lateral displacement and isolate the fasteners 59 from laterally directed forces.

The top surface 43 of the frame 42 may have a laterally elongated opening 61 formed therein and disposed substantially centrally with respect to the saddle. Such opening is adapted to receive a protuberance or other downwardly extending projection provided by the spring assembly 25 so as to establish a positive location between the truck and the spring assembly in a longitudinal direction. The frame 42 may also have a plurality of relatively large voids provided therein to reduce the over-all weight of the truck.

The truck 41 is provided with a recess 62 along the inner edge portion thereof, and extending along the bottom of such recess is a wall or shelf 63 equipped with an upwardly extending clamp wall 64 that terminates below the top surface 43 of the frame and extends longitudinally thereof. The clamp wall 64 is adapted to cooperate with the hook 38 of the anchor structure 30 in lashing the associated moving van to the railway car 10.

As stated hereinbefore, a pair of trucks are provided for the axle assembly 20 of each of the moving vans, and such trucks are arranged right and left and are disposed inwardly of the road wheels 23 respectively carried at opposite ends of the axle 22 which comprises a part of the axle assembly. The trucks are fixedly related relative to the axle housing 21, and are respectively secured below the spring assemblies 25 which extend under the axle housing. The two pairs of fasteners 59 respectively cooperate with the trucks and draw the same upwardly into tight frictional engagement with the associated spring assembly; each spring assembly, in turn, is drawn upwardly and into tight frictional engagement with the associated mounting member 60, and the mounting members are urged by the respectively associated fasteners into frictional engagement with the axle housing 21.

During railway transportation, the two pairs of flanged rollers respectively provided by the trucks rollingly engage the rails of the auxiliary track that extends longitudinally along the top of the railway car 10, and support the associated moving van thereon independently of its road wheels which at such time are located laterally outwardly of the adjacent rails. During road operation, the flanged rollers are disposed well above the lower surface of the road wheels 23 and do not interfere with movement of the van over a roadway.

In view of the foregoing it is apparent that there has been provided a combination road and railway vehicle of the type including underslung rear springs resiliently mounting the rear end of the chassis upon the rear axle housing thereof and comprising an improved truck arrangement carried by the rear springs thereof for mounting the rear end of the vehicle upon a trackway provided on the top of an associated railway car, or the like.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A combination road and railway vehicle, comprising a longitudinally extending chassis having a pair of laterally spaced springs disposed therebelow and secured thereto, a laterally extending axle housing located below said chassis in overlying relation with a portion of each of said springs for connection therewith resiliently to support said chassis and being equipped with an axle carrying road wheels at the opposite ends thereof, a pair of trucks respectivley positioned in underlying relation with the portions of said springs underlying said axle housing, each of said trucks having a saddle receiving and seating the associated overlying spring portions thereon positively to locate the associated truck with reference to the associated spring and to prevent relative movement between the truck and the spring laterally along the axis of said axle housing, and a pair of fastener structures respectively arranged with said trucks, each of said fastener structures including a mounting element disposed between the associated spring and said axle housing and providing a seat receiving and seating said axle housing therein and also a pair of fastener elements extending through the associated mounting element and along the lateral edges of the associated spring in spaced relation therewith for fixedly securing the associated truck and spring and mounting element to said axle housing with the associated truck located in underlying relation with the associated spring and with the spring disposed in underslung relation with said axle housing, each of said trucks carrying two spaced-apart and inwardly facing flanged rollers respectively disposed in front of and in rear of said axle housing in longitudinal alignment and inwardly of the adjacent road wheel and disposed well above the lower surface thereof so as to prevent interference by said rollers with a road engaged by said road wheels during road operation of said vehicle, said two pair of rollers being arranged to straddle and to engage the two rails of a cooperating longitudinally extending track carried by an associated railway car so as to support said axle housing and said vehicle upon the track independently of said road wheels and with said road wheels projecting laterally outwardly on opposite sides of the track during railway operation of said vehicle.

2. The vehicle set forth in claim 1, in which each of said springs is an elongated longitudinally extending leaf spring assembly secured at the end portions thereof to said chassis.

3. The vehicle set forth in claim 1, in which the saddle in each one of said trucks includes a generally horizontally disposed supporting surface in underlying engagement with the associated spring, and in which each of said saddles also includes a pair of laterally spaced abutment elements extending upwardly above the associated supporting surface thereof for snugly straddling the associated spring in engagement therewith to effect the aforesaid prevention of relative movement between said one truck and the associated spring laterally along the axis of said axle housing.

4. The vehicle set forth in claim 1, in which each of said fastener elements comprises an inverted generally U-shaped bolt embracing the upper surface portion of said axle housing and anchored at each of its ends to the associated truck.

References Cited in the file of this patent

UNITED STATES PATENTS

| | | |
|---|---|---|
| 2,478,647 | Watts et al. | Aug. 9, 1949 |
| 2,577,830 | Watts et al. | Dec. 11, 1951 |
| 2,864,321 | Clejan | Dec. 16, 1958 |
| 2,905,104 | Bounds | Sept. 22, 1959 |